United States Patent Office 2,845,383
Patented July 29, 1958

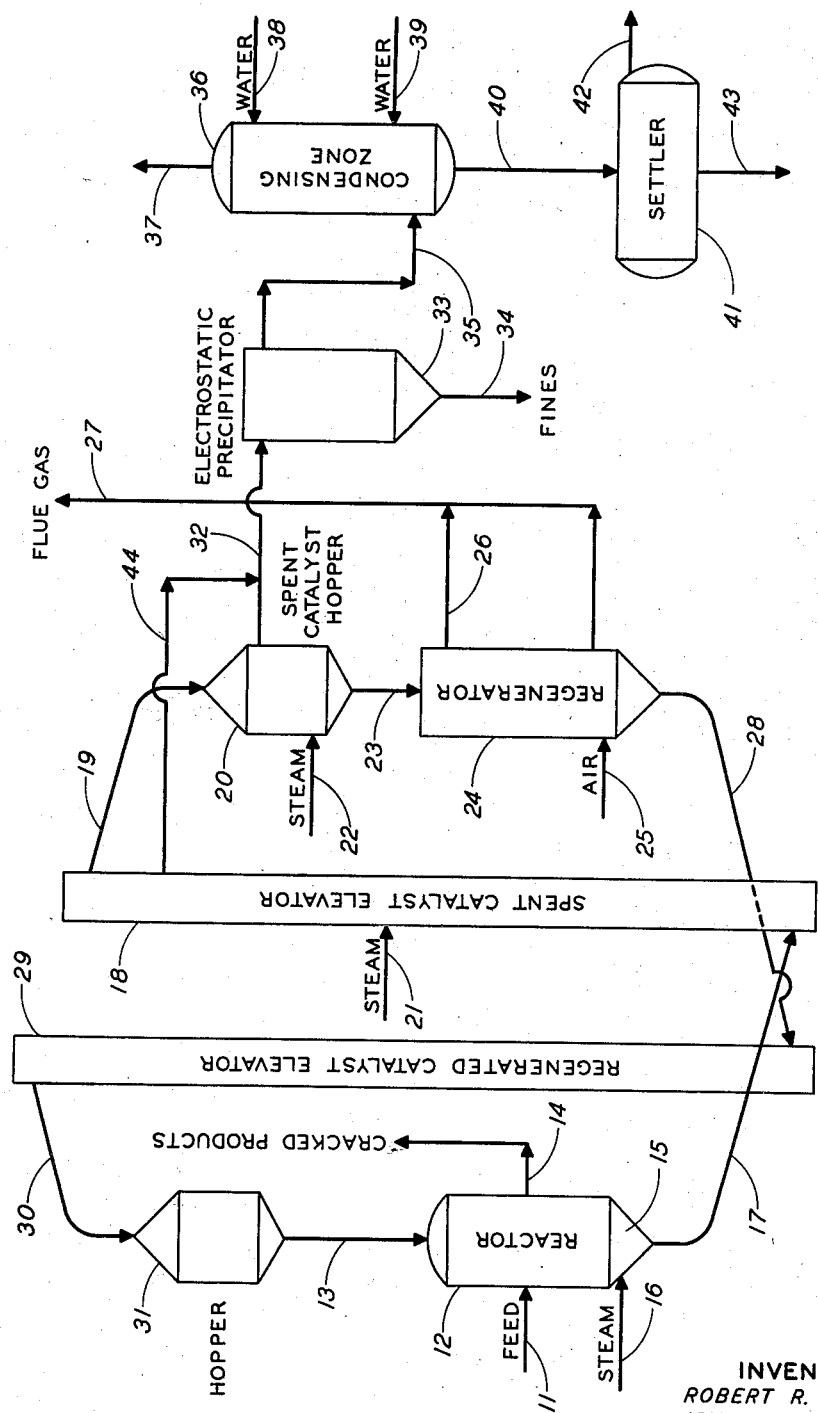

2,845,383

METHOD FOR CONTROLLING ATMOSPHERIC POLLUTION

Robert R. Bowles, Jr., Orinda, and Irving C. Brown, Jr., Berkeley, Calif., assignors, by direct and mesne assignments, to California Research Corporation, San Francisco, Calif., a corporation of Delaware Application December 31, 1954, Serial No. 479,013

5 Claims. (Cl. 196—52)

This invention relates to a method for reducing the amount of noxious impurities released to the atmosphere from a hydrocarbon conversion process, and more particularly, to a process for abating the flue gas plume emanating from a catalytic cracking unit.

While a number of processes exist for catalytically cracking petroleum fractions, the method with which this invention is concerned is one of the type wherein the catalyst, in the form of small beads, pellets or other particulate shape, is passed downwardly through a suitable reactor vessel into which the hydrocarbon feed stream is continuously introduced and from which the stream of product gases is withdrawn in the conventional fashion. In this system the spent catalyst is continuously withdrawn from a lower portion of the reactor and is transferred by gravity, an elevator or other mechanical means, or by a gas lift system, to a regeneration zone wherein the carbonaceous matter is burned off. The regenerated catalyst is then returned to the reaction zone for reuse, again by suitable transfer means, while the gaseous stream of combustion products from the regenerator is vented to the atmosphere. These flue gases, however, are malodorous and unsightly in color, and frequently contain appreciable amounts of minute catalyst, or dust particles.

With the problem of air pollution being one of growing concern to the petroleum industry and to the public, it would be desirable if a method were available for reducing the content of dust and other noxious components of the gas plumes discharged from a catalytic cracking unit, and it is a primary object of this invention to provide such a method. A further object of the present invention is to provide a method for so abating the flue gas plume emanating from a catalytic cracking unit of the type wherein the hydrocarbon feed is contacted with a moving bed of particulate catalyst.

In general terms, the present invention is based upon the discovery that the plume from a catalytic cracking unit may be rendered substantially innocuous by so conducting the process that the spent catalyst leaving the reaction zone is first subjected to a stripping operation under the superatmospheric pressure conditions prevailing in he said zone, and is thereafter stripped under substantially lower pressures, with the strippant streams from the stripping zones being freed of the catalyst fines and other dust particles present therein as well as of the components boiling above 100° F. before being discharged to the atmosphere along with the flue gas stream from the catalyst regeneration zone.

To facilitate understanding of the invention, reference is made to the attached drawing, the single figure of which is a diagrammatic representation of the method of the present invention as applied to a Thermofor catalytic cracking process. Because this process is widely known in the petroleum refining art, no attempt is made to describe or illustrate the process in a detailed manner except where the present invention is applicable.

In the drawing a hydrocarbon feed, for example gas oil, is introduced by line 11 into reactor 12 wherein the feed is cracked by contact with a moving bed of hot, descrete catalyst entering reactor 12 by line 13 (comprising a pressure seal leg), normally at a temperature in the range of from about 850 to 925° F., a pressure of from 7 to 15 p. s. i. g. The cracked products are removed from reactor 12 by line 14 and are passed to conventional facilities (not shown) for recovering the various product fractions such as light gases, gasoline, cycle oil and heavy bottoms.

Following contact with the feed, the spent catalyst, which has a carbonaceous deposit (coke) disposed upon its surface, continues to move downwardly in the reactor as a compact bed and passes through a primary stripping section 15 located in the bottom of reactor 12. Steam, entering section 15 by line 16 at a pressure in excess of that in the upper portion of the reactor, performs a dual purpose in that it strips the spent catalyst and also acts as a sealing gas to prevent the escape of hydrocarbon product gases from the bottom of the reactor. A minor portion of the strippant steam is passed from the bottom of section 15 along with the spent catalyst through line 17 to the bottom of spent catalyst elevator 18. The remaining steam is discharged from the system in the cracked products line 14.

While for purposes of simplicity the elevator 18 is only shown schematically, in general it may be said to be comprised of a shaft enclosing a series of buckets that transport the spent catalyst to the top of the shaft where the catalyst is dumped and passed by gravity through line 19 into spent catalyst hopper 20 wherein it is contacted, under essentially atmospheric or sub-atmospheric pressure, with an inert stripping medium, preferably steam, entering the hopper by line 22. This stripping operation, and the subsequent treatment of the strippant, will be discussed in more detail below. The stripped spent catalyst passes from hopper 20 by line 23 into regenerator 24, commonly termed a Thermofor kiln, wherein the catalyst is contacted with air at temperatures in the order of 850° to 1150° F. as it passes from top to bottom of the kiln. Regeneration is performed in a series of semi-independent burning zones in which air is introduced (such as by line 25) and passed throughout each zone by distribution channels. Flue gas, comprising the combustion products from the regeneration step, is collected and passed to the atmosphere by lines 26 and 27. Hot, reactivated catalyst is passed from regenerator 24 by line 28 to the bottom of elevator 29 (similar in construction to elevator 18) from which it is passed by line 30, hopper 31, and line 13 into reactor 12 where it contacts further quantities of fresh feed.

The spent catalyst gravitating through hopper 20 is contacted with a stripping medium under essentially atmospheric or sub-atmospheric pressures, and the gaseous strippant stream effluent is separated from the contents of hopper 20 and removed separately therefrom by line 32 normally at a temperature in the range of from about 700 to 900° F. Contained in the strippant stream are extremely fine particles of catalyst dust resulting from the attrition of the catalyst as it passes through the lines, vessels, and elevators of the cracking unit. Since these particles are of such fine character that they cannot be removed from the system by conventional cyclone separators, the strippant stream is passed into separation zone 33, preferably comprising an electrostatic precipitator, wherein from 90 to 98 percent of the dust is removed and discharged by line 34. Because the precipitator will remove droplets of liquid as well as solid particles, the strippant stream entering zone 33 should be maintained at a temperature in excess of 500° F. so that the quantity of oil adsorbed on the particles will be sufficiently small that the particles can be easily removed without agglomerating. If the temperature of the strippant effluent is such that some components are in the liquid phase, the precipitator will rapidly fill with a viscous mass of liquid and solid, thus requiring a shut down of operations in order to remove the mass and put the precipitator in condition for further use.

From precipitator 34 the strippant effluent, less essentially all of the catalyst dust, is passed by line 35 into condensing zone 36 wherein the components of the effluent boiling above about 100 to 150° F. are condensed to the liquid phase and from which the uncondensed components are vented to the atmosphere by line 37, or, preferably, by passing them into the flue gas passing from the system by line 27. In the drawing, condensation in zone 36 is shown to be accomplished by contacting the effluent with water entering the zone by lines 38 and 39. Conventional condensing means such as a quench tower or a shell and tube condenser are adequate for this purpose.

The liquefied components are passed from zone 36 by line 40 into settler 41 wherein an upper hydrocarbon and a lower aqueous phase are formed. The upper layer is removed from settler 41 by line 42 and the lower layer by line 43.

A modification of the present invention is also shown in the accompanying drawing. As noted in the description above, a minor portion of the stripping steam entering primary stripping section 15 by line 16 is passed out of the section along with the spent catalyst by line 17 from which it is introduced to spent catalyst elevator 18. Because the elevator is enclosed within a shaft, the steam entering the bottom of the elevator by line 17, plus any steam that may be injected by line 21 further up the elevator to further strip the spent catalyst, is carried up the shaft since the pressure at the top of the shaft is lower than at the bottom. In order to prevent venting this steam to the atmosphere because of the undesirable components contained therein, it is passed from the top of elevator 18 by line 44 from which it enters line 32 and is then passed along with the effluent from hopper 20 through the system as described above. In this manner all of the stripping mediums used for purging the spent catalyst that can be vented to the atmosphere are subjected to the dust removal and condensing operations of the present invention, thereby considerably reducing the number of undesirable components that cause the unsightly plume and which are normally discharged into the atmosphere.

The following example illustrates a typical embodiment of the present invention. For convenience the operation will be described in conjunction with the process diagrammed in the accompanying figure.

*Example*

In this example, 20,000 barrels/day of straight-run gas oil is passed by line 11 into reactor 12 and contacted with a silica-alumina bead cracking catalyst continuously entering the reactor by line 13 at the rate of 450 tons/hr. A cracking temperature of 875° F. and a pressure of 8 p. s. i. g. are maintained in the reactor. The spent catalyst passes through stripping section 15 wherein it is contacted with 5000 lbs./hr. of stripping steam introduced into the section by line 16 at a pressure in excess of that maintained in the reactor. An additional 1000 lbs./hr. of steam are passed by line 21 into the spent catalyst elevator 18 to further purge the spent catalyst.

The spent catalyst gravitating through hopper 20 (operating at 0 p. s. i. g.) is again stripped with 7000 lbs./hr. of steam entering the hopper by line 22, and the gaseous effluent, at a temperature of about 860° F., is mixed with the stripping steam passing from the elevator 18 by line 44. The mixture of stripping mediums is cooled to a temperature of 650° F. by contact with a water spray (not shown in the drawing) and is passed into the electrostatic precipitator 33 from which is removed 200 lbs./hr. of dry catalyst fines. The dust-free effluent is then contacted in a condensing zone (quench tower) with 600 gals./min. of water. From line 37 is discharged 500 lbs./hr. of uncondensed gases, such as nitrogen and carbon dioxide, at a temperature of 150° F. From line 40 a liquid phase is passed to the settler from which is recovered 200 lbs./hr. of hydrocarbons.

In carrying out the cracking and stripping operations as described above, it has been found that the noxious odors and offensive plume has been considerably reduced. It is apparent that the objectives of the present invention have been realized as shown by the fact that 200 pounds of catalyst dust, and 200 pounds of valuable hydrocarbons are recovered each hour that in the past have been discharged into the atmosphere as components of the flue gas.

We claim:

1. In a process wherein a hydrocarbon feed is catalytically cracked under elevated pressures and temperatures in a reaction zone in the presence of a downwardly moving particulate cracking catalyst, from which zone cracked product gases are removed and from which spent catalyst is withdrawn and is thereafter contacted with an oxidizing gas in a regeneration zone, from which latter zone regenerated catalyst is returned to the said reaction zone and a flue gas containing odor and color-contributing impurities is discharged into the atmosphere, the improvement which comprises contacting said spent catalyst with steam in a primary stripping zone, said stripping zone being located within said reaction zone, at a pressure in excess of the pressure maintained in said reaction zone; contacting said spent catalyst in a secondary stripping zone with further quantities of steam at substantially atmospheric pressure; separating said strippant streams from the contents of said stripping zones; passing said separated streams into a separation zone at an elevated temperature to remove catalyst dust from said streams; passing the dust-free strippant streams into a condensing zone wherein the components of said streams boiling above about 100° F. are liquefied; and passing the uncondensed components of said streams into the atmosphere.

2. The improvement as defined in claim 1 wherein the strippant streams are passed into the separation zone at a temperature in the range of from about 500° to 875° F.

3. The improvement as defined in claim 1 wherein the uncondensed components of the strippant streams are passed into the flue gas and thence into the atmosphere.

4. The improvement as defined in claim 2 wherein the separation zone comprises an electrostatic precipitator.

5. In a process wherein a hydrocarbon feed is catalytically cracked under a pressure in the range of from about 7 to 15 p. s. i. g. and a temperature in the range of from about 850 to 925° F. in a reaction zone in the presence of a downwardly moving particulate cracking catalyst, from which zone cracked product gases are removed and from which spent catalyst is conveyed by a catalyst lift system to a spent catalyst hopper and thence to a regeneration zone wherein the spent catalyst is contacted with an oxidizing gas, from which latter zone regenerated catalyst is returned to said reaction zone for reuse and a flue gas containing odor and color-contributing impurities is discharged into the atmosphere, the improvement which comprises contacting said spent catalyst with steam in a stripping zone, said stripping zone located at the point of spent catalyst withdrawal from said reaction zone, at a pressure in excess of the pressure maintained in said reaction zone; recovering the strippant stream from said stripping zone; passing said spent catalyst from said stripping zone by the said catalyst lift system to said spent catalyst hopper; contacting said spent catalyst with further quantities of steam at substantially 0 p. s. i. g.; separating a dust-containing strippant stream from the contents of said hopper; passing the catalyst dust-containing strippant stream from said stripping zone along with said dust-containing strippant stream from said hopper at a temperature in the range of from about 500° to 875° F. to an electrostatic precipitator wherein essentially all of the catalyst dust contained in said streams is removed; passing the essentially dust-free streams to a condensing zone wherein components of said streams boiling above about 100° F. are liquefied; discharging uncondensed components of said streams into the flue gas and thence into the atmosphere; and passing the liquefied components from said condensing zone to a separation zone to recover a hydrocarbon upper layer and an aqueous lower layer.

References Cited in the file of this patent
UNITED STATES PATENTS

| | | |
|---|---|---|
| 2,423,850 | Peery | July 25, 1947 |
| 2,471,398 | Simpson et al. | May 24, 1949 |
| 2,658,822 | Hengstebeck | Nov. 10, 1953 |
| 2,695,266 | Drew et al. | Nov. 23, 1954 |
| 2,753,295 | Ramella | July 3, 1956 |
| 2,759,877 | Eron | Aug. 21, 1956 |